United States Patent
Zhang et al.

(10) Patent No.: US 11,343,709 B2
(45) Date of Patent: May 24, 2022

(54) HIDDEN WLAN DETECTION FOR BETTER ECOSYSTEM DESIGN IN 5G

(71) Applicant: Apple Inc., Cupertino, CA (US)

(72) Inventors: Wei Zhang, Santa Clara, CA (US); Tianyan Pu, Cupertino, CA (US); Haitong Sun, Irvine, CA (US); Wei Zeng, San Diego, CA (US); Dawei Zhang, Saratoga, CA (US); Sami M. Almalfouh, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 16/245,485

(22) Filed: Jan. 11, 2019

(65) Prior Publication Data

US 2019/0253920 A1    Aug. 15, 2019

Related U.S. Application Data

(60) Provisional application No. 62/631,274, filed on Feb. 15, 2018.

(51) Int. Cl.
| | |
|---|---|
| *H04W 28/02* | (2009.01) |
| *H04B 17/318* | (2015.01) |
| *H04W 8/24* | (2009.01) |
| *H04W 16/14* | (2009.01) |
| *H04W 24/08* | (2009.01) |
| *H04W 24/10* | (2009.01) |
| *H04W 80/02* | (2009.01) |
| *H04W 84/12* | (2009.01) |
| *H04W 88/06* | (2009.01) |
| *H04W 72/12* | (2009.01) |

(52) U.S. Cl.
CPC ...... *H04W 28/0284* (2013.01); *H04B 17/318* (2015.01); *H04W 8/24* (2013.01); *H04W 16/14* (2013.01); *H04W 24/08* (2013.01); *H04W 24/10* (2013.01); *H04W 80/02* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2009/0082053 A1* | 3/2009 | Wei | H04L 1/0027 455/522 |
| 2012/0069756 A1* | 3/2012 | Ji | H04W 24/02 370/252 |

(Continued)

OTHER PUBLICATIONS

First Office Action for DE Patent Application No. 102019201897.7, dated Jul. 18, 2021.

*Primary Examiner* — Jay L Vogel
(74) *Attorney, Agent, or Firm* — Kowert, Hood, Munyon, Rankin & Goetzel, P.C.

(57) ABSTRACT

Apparatuses, systems, and methods for a wireless device and base station using a first radio access technology to monitor traffic load on a second radio access technology. A wireless device may monitor traffic of the second radio access technology and may transmit one or more traffic load reports to the base station. The base station may, based on the report(s) and its own observations, determine whether a hidden network of the second radio access technology is present at the wireless device.

20 Claims, 8 Drawing Sheets

(56) References Cited

U.S. PATENT DOCUMENTS

| | | | |
|---|---|---|---|
| 2012/0115539 A1* | 5/2012 | Zhang | H04W 56/0045 455/524 |
| 2013/0017817 A1* | 1/2013 | Kim | H04W 8/22 455/418 |
| 2015/0173011 A1 | 6/2015 | Das | |
| 2015/0180676 A1* | 6/2015 | Bao | H04L 12/1886 370/230 |
| 2015/0341821 A1* | 11/2015 | Hong | H04W 28/08 370/230 |
| 2015/0351115 A1* | 12/2015 | Jeon | H04W 16/14 455/450 |
| 2016/0007350 A1 | 1/2016 | Xiong et al. | |
| 2016/0066195 A1* | 3/2016 | Moon | H04W 16/14 455/454 |
| 2016/0066204 A1 | 3/2016 | Khawer et al. | |
| 2016/0302230 A1 | 10/2016 | Novlan | |
| 2017/0013491 A1* | 1/2017 | Ma | H04W 72/0486 |
| 2017/0026819 A1* | 1/2017 | Xue | H04W 8/005 |
| 2017/0048763 A1* | 2/2017 | Ke | H04W 28/0268 |
| 2017/0188294 A1* | 6/2017 | Xu | H04W 72/042 |
| 2017/0238320 A1 | 8/2017 | Fukuta | |
| 2017/0367005 A1* | 12/2017 | Shi | H04W 4/70 |
| 2018/0027563 A1* | 1/2018 | Nguyen | H04W 72/0453 370/329 |
| 2018/0049211 A1* | 2/2018 | Chang | H04W 16/14 |
| 2018/0091994 A1* | 3/2018 | Ozturk | H04L 5/001 |
| 2018/0124622 A1* | 5/2018 | Van Der Velde | H04W 24/10 |
| 2018/0184317 A1 | 6/2018 | Li | |
| 2019/0081820 A1* | 3/2019 | Urabayashi | H04L 27/0006 |
| 2020/0015298 A1* | 1/2020 | Chae | H04W 76/14 |

\* cited by examiner

HIDDEN WLAN DETECTION FOR BETTER ECOSYSTEM DESIGN IN 5G

PRIORITY CLAIM

This application claims priority to U.S. provisional patent application Ser. No. 62/631,274, entitled "Hidden WLAN Detection for Better Ecosystem Design in 5G," filed Feb. 15, 2018, which is hereby incorporated by reference in its entirety as though fully and completely set forth herein.

FIELD

The present application relates to wireless devices, and more particularly to apparatus, systems, and methods for reducing interference between radio access technologies.

DESCRIPTION OF THE RELATED ART

Wireless communication systems are rapidly growing in usage. Further, wireless communication technology has evolved from voice-only communications to also include the transmission of data, such as Internet and multimedia content. Further, interference and collisions between transmissions of multiple radio access technologies (RATs) are increasingly possible (e.g., in unlicensed spectrum). For example, collisions may be possible between 5G/cellular transmissions and wireless local area network (WLAN) transmissions. Such interference may degrade the wireless ecosystem and lead to negative impacts on users of both RATs. Thus, improvements in the field are desired.

SUMMARY

Embodiments relate to apparatuses, systems, and methods to detect a hidden network (e.g., a wireless local area network (WLAN)). A base station (BS) and user equipment (UE) may communicate according to a first radio access technology (RAT), e.g., cellular/5G. The BS may transmit monitoring parameters to the UE. The monitoring parameters may specify intervals for monitoring WLAN traffic.

The UE and the BS may both monitor WLAN traffic. For example, the BS and UE may determine traffic load levels. The UE may transmit one or more traffic load reports to the BS based on the monitored traffic.

The BS may determine whether a hidden WLAN is present, based at least in part on comparing observed and reported WLAN traffic. In response to determining the presence of a hidden WLAN, the BS may take actions to avoid or minimize interference, e.g., between cellular transmissions and the WLAN. For example, the BS may adjust scheduling of the UE.

The techniques described herein may be implemented in and/or used with a number of different types of devices, including but not limited to base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings.

Figure 1:
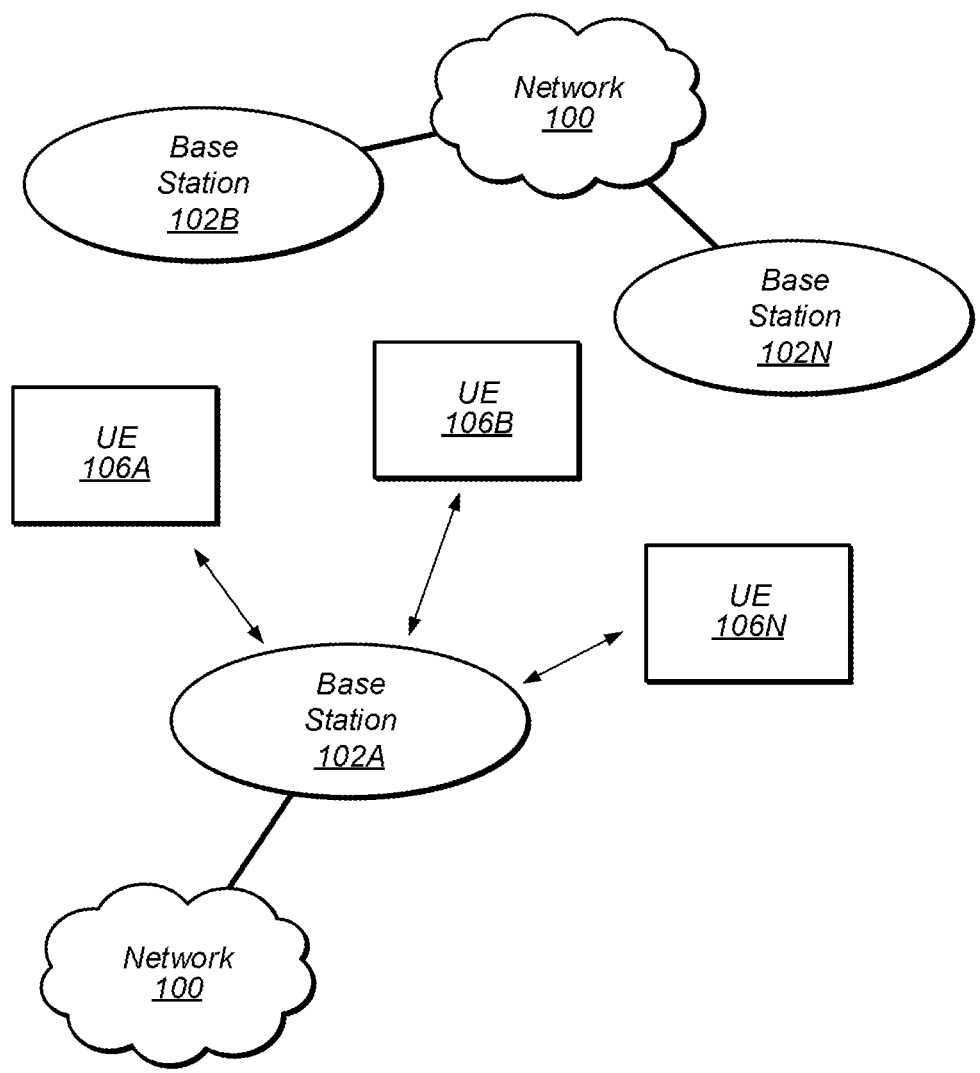
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication. A UE capable of operating according to 5G standards may be referred to as a new radio unit (NRU).

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

IEEE 802.11—refers to technology based on IEEE 802.11 wireless standards such as 802.11a, 802.11.b, 802.11g, 802.11n, 802.11-2012, 802.11ac, 802.11ad, 802.11ay, and/or other IEEE 802.11 standards. IEEE 802.11 technology may also be referred to as "Wi-Fi" or "wireless local area network (WLAN)" technology.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
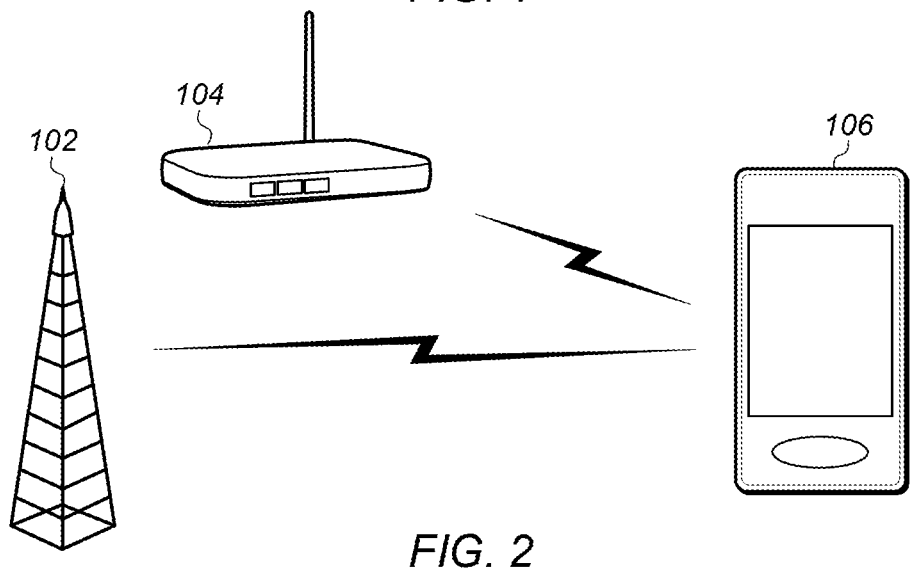
FIG. 2 illustrates a base station (BS) and an access point (AP) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE) or "new radio unit" (NRU). Thus, the user devices 106 are referred to as UEs, UE devices, or NRUs.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

In some embodiments, base station 102A may be (or may include) an access point (AP). The base station 102A may capable of communicating using one or more wireless local area network (WLAN) communication standards. For example, the base station 102A capable of communicating using IEEE 802.11 standards (e.g., Wi-Fi).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 and an access point 104, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

The access point 104 may be an access point providing a wireless local area network (WLAN). The access point 104 may be equipped to communicate with a network 100 (e.g., a wide area network (WAN), such as the Internet, among various possibilities). Thus, the access point 104 may facilitate communication between the UEs 106 and/or between the UEs 106 and the network 100. The access point 104 and the UEs 106 may be configured to communicate over the transmission medium using Wi-Fi, including any of various versions of IEEE 802.11 (e.g., a, b, g, n, ac, ad, ay, wake-up radio (WUR), etc.).

In some embodiments, the WLAN may be an ad hoc network, e.g., using Personal Basic Service Set (PBSS) architecture, e.g., as defined in IEEE 802.11 ad. In such cases, the role of access point 104 may be performed by a UE device (e.g., one of the UEs 106) acting as a PBSS Control Point (PCP). For convenience, the terms "access point" and "AP/PCP" may be used herein to include an access point or PCP.

Figure 3:
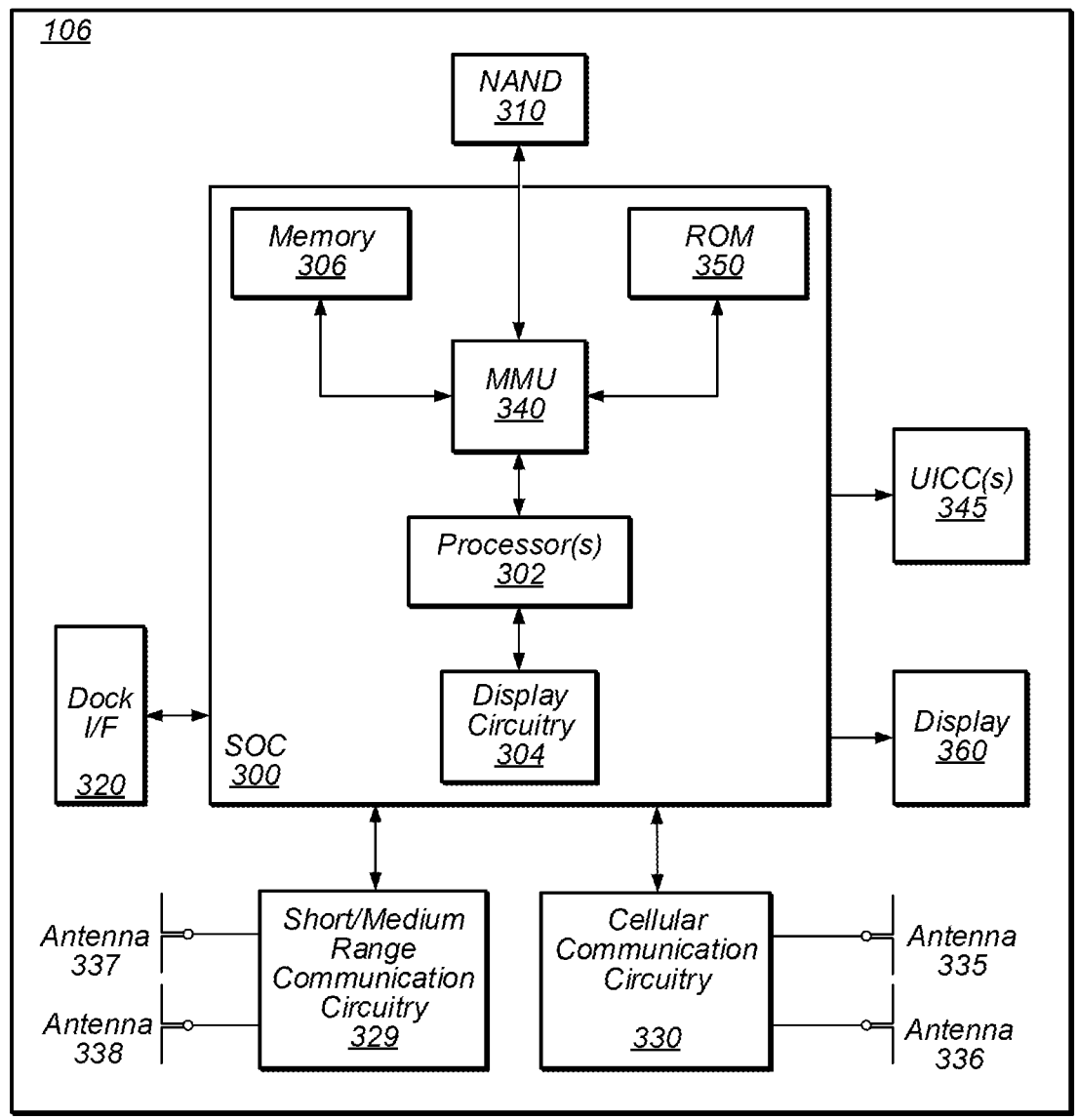
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a new radio unit (NRU), a mobile device or mobile station (STA), a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry (e.g., IEEE 802.11, Wi-Fi)). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short/medium range wireless communication circuitry 329 may each include one or more processing elements. In other words, one or more processing elements may be included in cellular communication circuitry 330 and, similarly, one or more processing elements may be included in short/medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short/medium range wireless communication circuitry 329 may include one or more ICs that are configured to perform the functions of short/medium range wireless communication circuitry 329. In addition, each integrated circuit may include circuitry (e.g., first circuitry, second circuitry, etc.) configured to perform the functions of short/medium range wireless communication circuitry 329.

Figure 4:
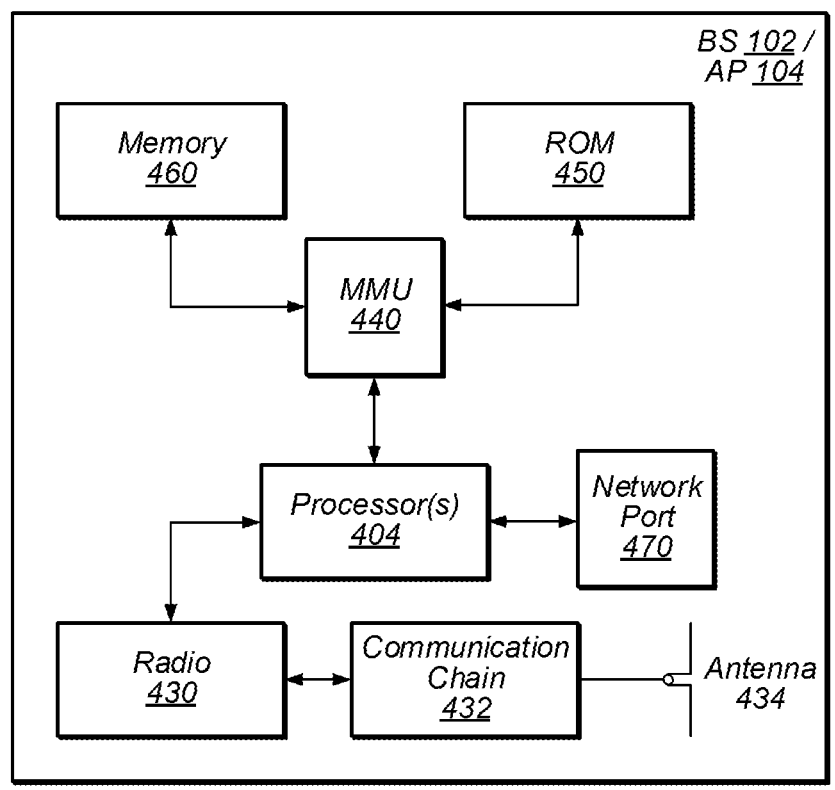
FIG. 4 illustrates an example block diagram of a BS according to some embodiments.

FIG. 4—Block Diagram of a Base Station/Access Point

FIG. 4 illustrates an example block diagram of a base station 102/access point 104, according to some embodiments. It is noted that the base station/access point of FIG. 4 is merely one example of a possible base station/access point. As shown, the base station 102/access point 104 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102/access point 104 may include at least one network port 470. The network port 470 may be configured to couple to a network (e.g., a telephone network and/or the internet) and provide a plurality of devices, such as UE devices 106, access to the network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102/access point 104 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102/access point 104 may be considered a 5G NR cell and may include one or more transition and reception points (TRPs). In addition, a UE capable of operating according to 5G NR may be connected to one or more TRPs within one or more gNBs.

The base station 102/access point 104 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station (BS) 102/access point (AP) 104 may be configured to communicate wirelessly using multiple wireless communication standards. In some instances, the base station 102 may include multiple radios, which may enable the base station 102 to communicate according to multiple wireless communication technologies. For example, as one possibility, the base station 102/access point 104 may include an LTE radio for performing communication according to LTE as well as a 5G NR radio for performing communication according to 5G NR. In such a case, the base station 102/access point 104 may be capable of operating as both an LTE base station and a 5G NR base station. As another possibility, the base station 102/access point 104 may include a multi-mode radio which is capable of performing communications according to any of multiple wireless communication technologies (e.g., 5G NR and WLAN/Wi-Fi, LTE and WLAN/Wi-Fi, LTE and UMTS, LTE and CDMA2000, UMTS and GSM, etc.).

As described further subsequently herein, the BS 102/AP 104 may include hardware and software components for implementing or supporting implementation of features described herein. The processor 404 of the base station 102/access point 104 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
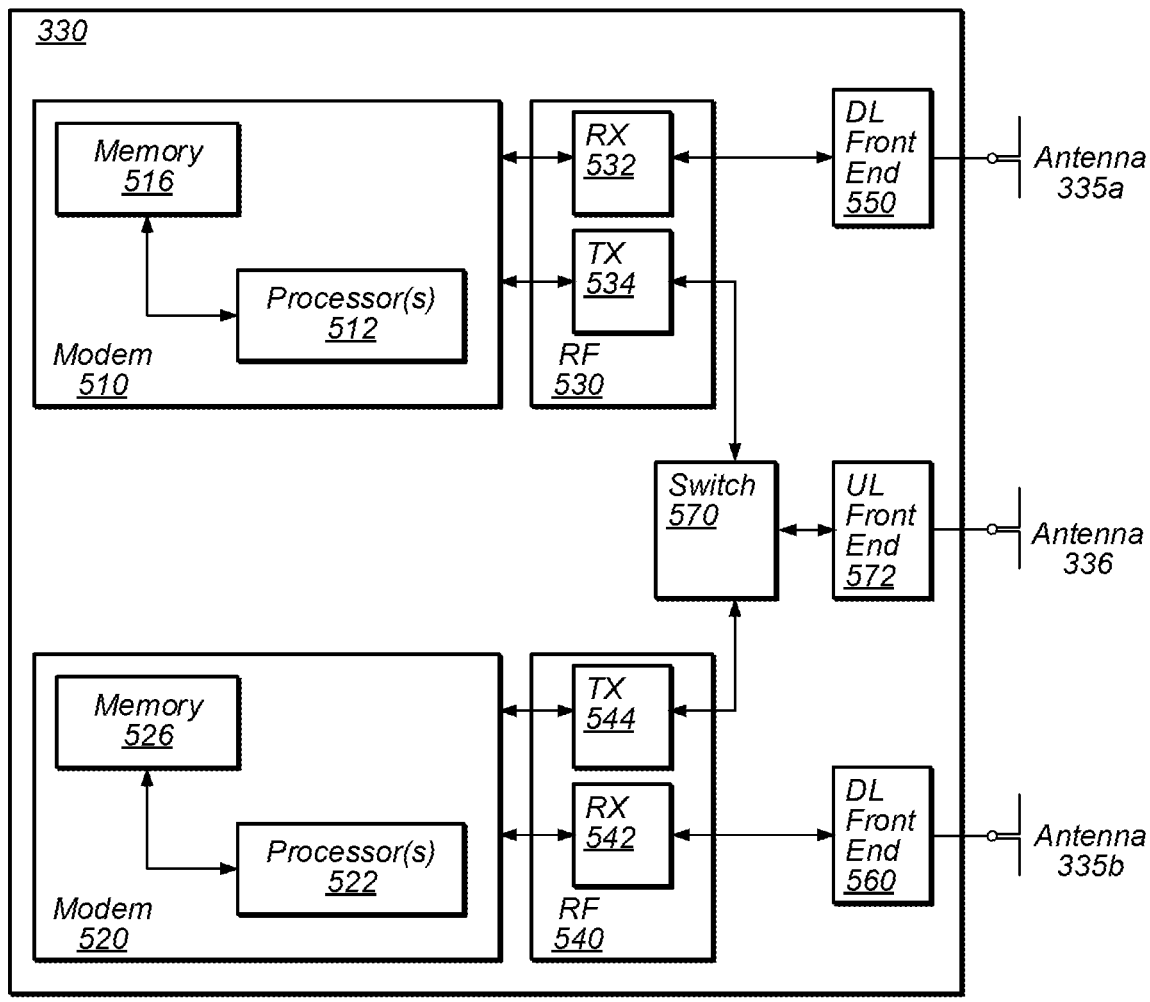
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, NRU, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second RAT, wherein the second cell operates in a second system bandwidth. The first and second system bandwidth may be the same, they may be separate, or they may overlap. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

It will be appreciated that the illustrated circuitry is exemplary only. In some embodiments, (different numbers of modems, RF front ends, DL front ends, UL front ends, switches, and/or antennas are possible, and may be configured as desired.

Figure 6A:
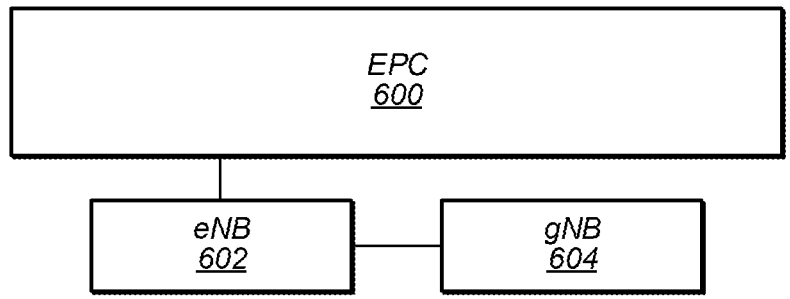
FIG. 6A illustrates an example of connections between an EPC network, an LTE base station (eNB), and a 5G NR base station (gNB), according to some embodiments.
Figure 6B:
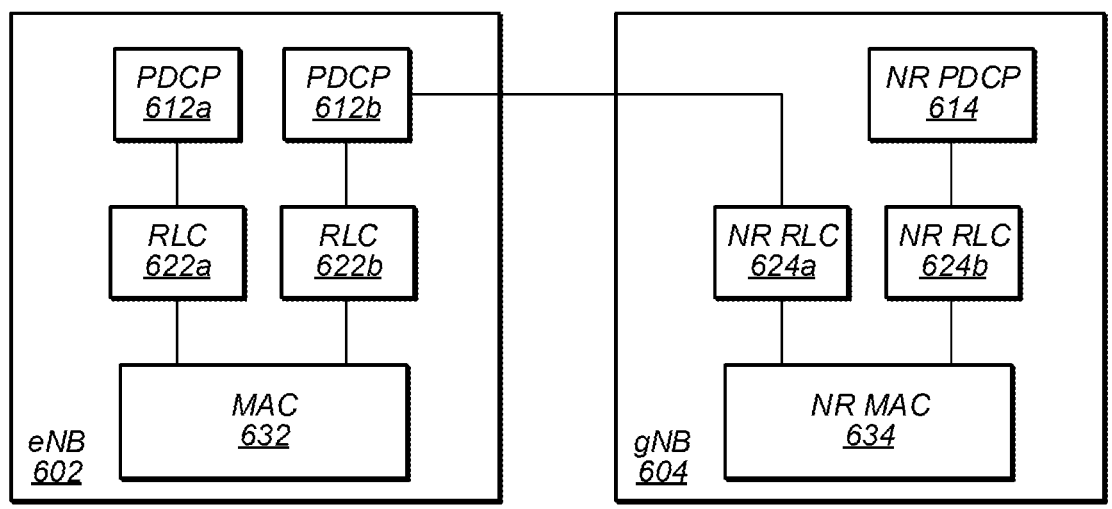
FIG. 6B illustrates an example of a protocol stack for an eNB and a gNB, according to some embodiments.

FIGS. 6A-6B: 5G NR Non-standalone (NSA) Operation with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 622b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

In general, a non-stand alone (NSA) implementation employs dual connectivity in both uplink (UL) and downlink (DL). In other words, dual connectivity requires two active radio links in both UL and DL. In some implementations, depending on frequency band combinations, two (substantially) concurrent UL connections may cause receiver sensitivity degradation at the UE.

In addition, future specifications NR NSA may require a UE to support co-existence of LTE UL and NR UL within the bandwidth of an LTE component carrier and co-existence of LTE DL and NR DL within the bandwidth of an LTE component carrier. Further, such an implementation may be further required to minimize impact to NR physical layer design to enable such co-existence and to not impact LTE legacy devices (e.g., devices that do not support NR) operating on an LTE carrier co-existing with NR.

Thus, in some implementations of NR NSA, a UE may be configured with multiple UL carriers on different frequencies (e.g., where there is at least one LTE carrier and at least one NR carrier of a different carrier frequency) but operate on either the LTE carrier or the NR carrier at a given time. In other words, the UE may be configured to operate on only one of the carriers at a given time among a pair of LTE and NR carriers. Note that such an implementation may also allow for (substantially) simultaneous operation on two or more UL carriers at a given time.

In some embodiments, a UE, such as communication device 106, may support LTE and NR co-existence on specific bands and/or frequencies. In addition, a UE may determine that for a band combination, UL sharing in NSA mode may be required to avoid receiver sensitivity degradation. Thus, the UE may need to inform the network that UL sharing mode will be used for the LTE/NR band combination. In some embodiments, a conditional field may be added to a UE capability message. The conditional field may indicate whether UL sharing mode will be used for the allocated band combination. In addition, the conditional field may indicate on which bands/frequencies the UE supports NSA operations. Note further that in some embodiments, e.g., as further described below, the UE may be configured to perform NSA operations via time division multiplexing (TDM). However, in other embodiments, the UE may be configured to perform NSA operations via other mechanisms such as frequency division multiplexing (FDM) or MAC layer multiplexing.

Figure 7:
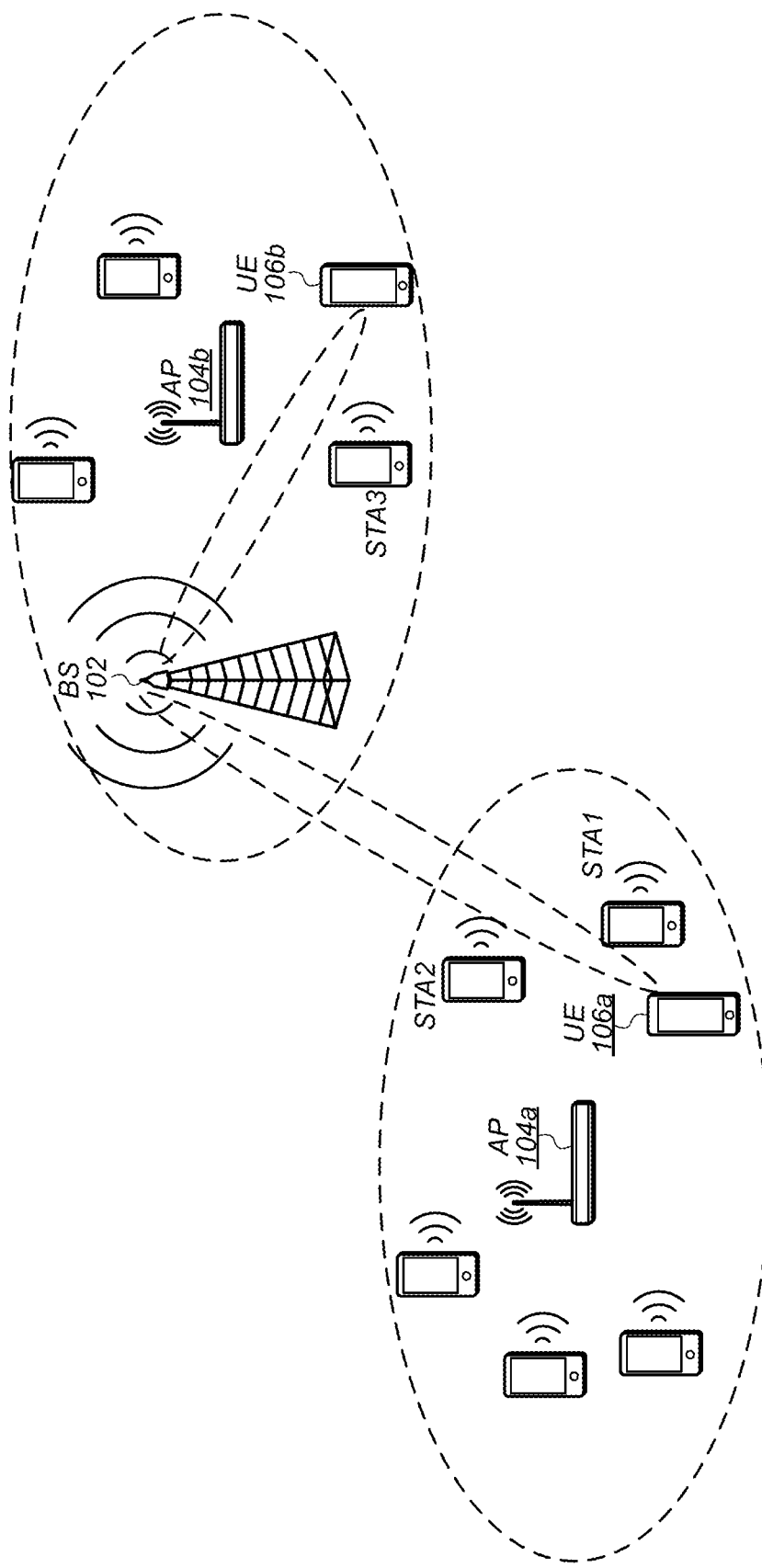
FIG. 7 illustrates an example of a BS in communication with UEs in range of wireless local area networks (WLAN), according to some embodiments.

FIG. 7—Interaction of 5G and WLAN in Unlicensed Spectrum

In some embodiments, WLAN and 5G may use the same or overlapping frequency resources. As a result, traffic on one RAT may interfere with traffic on another, and may therefore increase congestion. For example, cellular transmissions colliding with WLAN transmissions may lead to retransmissions on the WLAN network and therefore may increase congestion. Such collisions may downgrade (e.g., negatively impact) the wireless ecosystem and may harm the experience of the end users of both cellular and WLAN networks (e.g., a lose-lose situation). WLAN transmissions may be polluted by the cellular transmissions, and WLAN users may experience more congestion and retransmission. Cellular users may experience worse radio link conditions (e.g., lower signal-noise ratio (SNR) and/or lower channel quality index (CQI)), smaller transport block size (TBS), and higher congestion (e.g., higher time and/or frequency resource occupancy).

Listen-before-talk (LBT) techniques may reduce the interference of cellular transmissions on WLAN networks, under some conditions. LBT is a contention-based protocol, according to which a transmitter may listen (e.g., determine whether another device is transmitting) prior to initiating a transmission (e.g., talking), and may wait for the medium to be clear (e.g., for no other device to be transmitting) before beginning its transmission. However, the benefits of LBT may be most significant for WLAN networks that are close to a 5G BS (e.g., sharing the same medium), and may be ineffective (e.g., relatively or completely) for WLAN networks that are further from the BS. If there are 5G users in the coverage of a WLAN network for which the 5G BS cannot monitor traffic (which may be referred to as a hidden WLAN network), the cellular transmissions may cause congestion on the hidden WLAN network that the BS cannot avoid through LBT. The maximum transmission power from a BS (plus beamforming gain) may generally be larger than the transmission power of a WLAN AP. Hidden WLAN networks may share a service set identifier (SSID) with a WLAN network that the BS can monitor. Request-to-send (RTS)/clear-to-send (CTS) hidden node detection approaches may not be able to reveal such hidden networks to the BS due to coverage constraints and the number of STAs in the overlapped coverage area.

FIG. 7 illustrates exemplary WLAN networks in range of a cellular/5G BS 102. BS 102 may use beamforming techniques to communicate with UE 106a, which is in the range of WLAN AP 104a, and with UE 106b, which is in the range of WLAN AP 104b. The networks of the two APs may be separate, e.g., they may not be in range of each other. The networks of the two APs may include any number of STAs; such STAs may be similar to UE 106, and/or may be any other type of WLAN enabled devices. The STAs may or may not be capable of cellular communications.

AP 104a may be relatively far from BS 102, e.g., the BS 102 may not be in range of the WLAN network (e.g., an 802.11 network) provided by AP 104a. BS 102 may therefore not be able to detect the WLAN transmissions to and from AP 104a, and LBT mechanics may not be effective for reducing/avoiding collisions between cellular and WLAN traffic (e.g., to/from AP 104a). For example, BS 102 may not be able to implement LBT effectively and may schedule cellular transmissions to/from UE 106a on time and/or frequency resources that may result in collisions with WLAN traffic of AP 104a. Thus, the WLAN traffic on the network of AP 104a may be significantly impacted by the cellular traffic to/from BS 102. Due to beamforming of the cellular signals between UE 106a and BS 102, the collisions between cellular signals and WLAN signals may primarily impact WLAN communications involving STAs 1 and 2. STAs 1 and 2 may experience the direct impact of collisions because they may be positioned close to the beam/path between BS 102 and UE 106a. However, the impacts of congestion may be experienced by all STAs in communication with AP 104a. For example, other STAs on the WLAN network of AP 104a may experience (e.g., heightened) collisions and congestion due to retransmissions associated with STAs 1 and 2. Note that UE 106a may or may not communicate with AP 104a.

AP 104b may be close to BS 102, e.g., the BS 102 may be in range of the WLAN network provided by AP 104b. BS 102 may therefore be able to detect the WLAN transmissions to and from AP 104b, and LBT mechanics may be effective for reducing/avoiding collisions between cellular and WLAN traffic. For example, BS 102 may be able to implement LBT to detect WLAN transmissions on the network of AP 104b, and thus schedule cellular transmissions on time and/or frequency resources that may avoid collisions. Thus, the WLAN traffic on the network of AP 104b may not be significantly impacted by the cellular traffic to/from BS 102. Note that UE 106b may or may not communicate with AP 104b.

Figure 8:
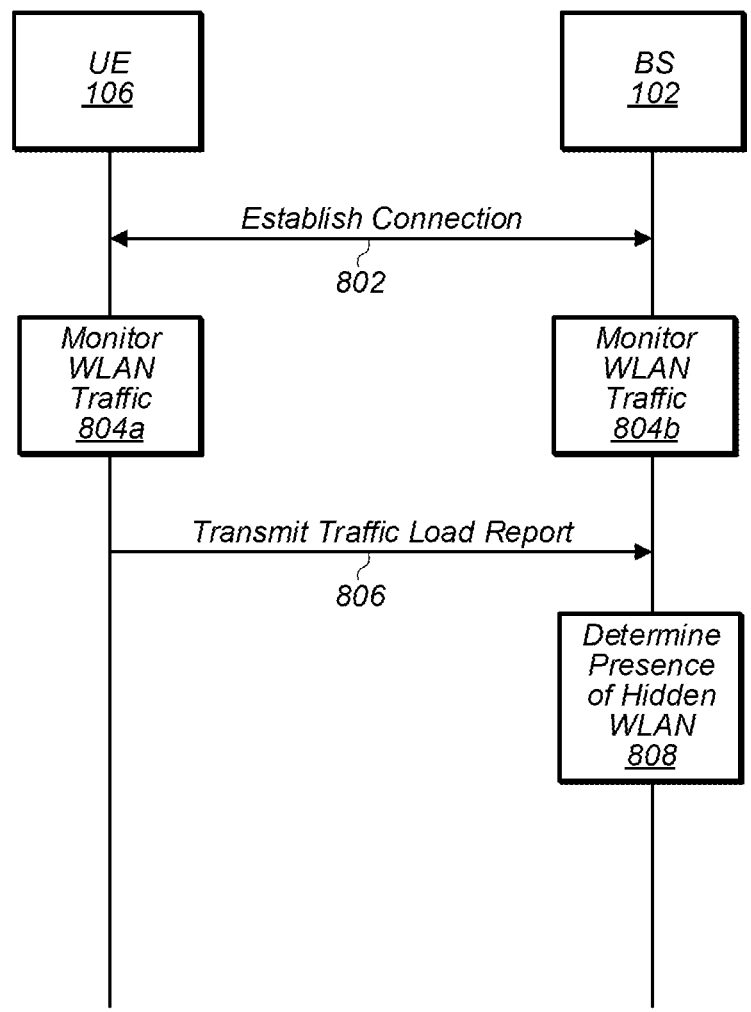
FIG. 8 illustrates a method for detecting a hidden WLAN network, according to some embodiments.

FIG. 8—Hidden WLAN Network Detection

In some embodiments, a UE 106 and a BS 102 may be able to detect a WLAN network that is hidden from the BS 102. UE 106 and BS 102 may be capable of communication according to one or more 5G standards, e.g., UE 106 may be an NRU and BS 102 may be a gNB. Based on such detection, the BS 102 and UE 106 may be able to reduce/avoid collisions between cellular transmissions to/from the BS 102 and WLAN transmissions of the hidden network.

FIG. 8 is a communication flow diagram illustrating one such method for an UE in communication with a BS, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 8 may be implemented by devices, such as a UE 106 and BS 102 illustrated in and described with respect to FIGS. 1-6, or more generally in conjunction with any of the computer systems or devices shown in the Figures herein, among other devices, as desired. Although aspects of the method of FIG. 8 are described with respect to communications using WLAN and cellular RATs, it will be appreciated that these RATs are exemplary only and that the methods may be applied to any RAT or combination of RATs. Further, the method may be applied to larger numbers of RATs (e.g., three or more RATs). As shown, the method may operate as follows.

The UE 106 and the BS 102 may establish a connection (802). The connection may include one or more configured carriers on an unlicensed band of spectrum (e.g., unlicensed frequency). The connection may also include licensed spectrum, according to some embodiments. The UE 106 and BS 102 may or may not use the connection to exchange data (e.g., for any application(s) executing on UE 106). The connection may be a cellular and/or 5G connection. The connection may be or include an RRC connection.

The BS 102 may request a capability report from the UE 106. The request may be transmitted (e.g., in a control message, among other possibilities) in response to configuring a carrier using unlicensed spectrum. The request may request information about the ability of the UE 106 to detect transmissions on other RATs (e.g., WLAN).

The UE 106 may transmit a capability report to the BS 102, and the BS 102 may receive the report. Among other information, the capability report may specify that the UE 106 is (or is not) capable of communicating (e.g., or at least receiving) according to one or more WLAN standards or other RATs. For example, the capability report may specify that the UE is (or is not) capable of detecting WLAN transmissions in unlicensed spectrum that may also be used for cellular transmissions to/from the BS 102. The capability report may be referred to as a WLAN capability report or a Wi-Fi capability report. The WLAN capability report may be included with (or in) a capability report that includes other information (e.g., by including a field for WLAN capability), or in a separate report, as desired. The WLAN capability report may be transmitted in any format desired and may include information such as indications of WLAN standards that are or are not supported or frequency ranges that can or cannot be monitored for WLAN transmissions. The capability report may or may not be transmitted or generated in response to a request from the BS 102. For example, the UE may generate and transmit a capability report in response to the request for a capability report. Alternatively, the UE may be configured to generate and transmit the capability report without receiving a request.

The BS 102 may configure a UE 106 that is capable of detecting WLAN traffic (e.g., a WLAN-capable UE) to monitor WLAN traffic. Such configuration may be performed in response to receiving a capability report. The BS 102 (and/or the UE 106) may configure various monitoring parameters. The monitoring parameters may be transmitted from the BS 102 to the UE 106. The monitoring parameters may be transmitted using various types of messages. For example, the monitoring parameters may be transmitted using one or more radio resource control (RRC) messages or MAC control elements (MAC-CE), among other possibilities. The monitoring parameter format (e.g., number of bits, etc.) may be configured as desired.

In some embodiments, the monitoring parameters may be preconfigured, e.g., in hardware or software of the UE.

The monitoring parameters for monitoring WLAN traffic may include a monitor periodicity ($T_m$), a traffic observation window ($T_w$), and one or more frequency bands (e.g., bandwidth part (BWP)), among other possibilities. The parameters may configure to monitor WLAN traffic at specific times, for example the time of a first periodic observation may be specified. In some embodiments, the parameters may direct the UE 106 to monitor all frequency bands for which there is potential interference between WLAN and cellular transmissions Alternatively, the parameters may specify a single or a subset of the bands for monitoring (e.g., indicating the specific subset for monitoring in one or more messages). The subset of bands may exclude one or more possible bands for monitoring (e.g., allowing for monitoring to be distributed among a plurality of UEs). The parameters may further specify how and when the UE is configured to report the monitoring results (e.g., via one or more traffic load report) to the BS 102. The BS 102 may (e.g., regularly or in response to changing conditions) update the monitoring parameters, and may thus change the monitoring configuration of the UE 106.

The UE 106 may monitor/observe WLAN traffic (804a). The UE 106 may monitor traffic according to the monitoring parameters. The UE 106 may periodically (e.g., at a periodicity of $T_m$) access the medium (e.g., unlicensed spectrum generally, or as specified by the monitoring parameters) to determine whether or not it is busy (e.g., whether or not traffic is present). The determination of whether or not the medium is busy may be based on various methods, for example the determination may be energy-based or may be RTS/CTS-based. RTS/CTS-based methods may be more accurate than energy-based methods, however energy-based methods may be applicable to more (e.g., all) WLAN networks. An RTS/CTS-based method may involve sending an RTS to the AP and determining whether or when a CTS (e.g., indicating that the medium is free) is received. Thus, an RTS/CTS-based method may differentiate between cellular traffic and WLAN traffic (e.g., because cellular traffic may not prevent the AP from providing a CTS, according to some embodiments). An energy-based method may involve detecting transmissions on the WLAN (e.g., from or to the AP and/or between other wireless stations on the WLAN).

Over the course of an observation window ($T_w$) the UE 106 may make several (e.g., N, where $N=T_w/T_m$) determinations or measurements of traffic. For example, if $T_m=1$ ms and $T_w=10$ ms, $N=10$ observations, among various possibilities. In other words, N times during each observation window, the UE may determine whether or not the medium is busy. The UE 106 may calculate WLAN traffic load as a percentage/fraction of the measurements for which the medium is busy. For example, the if 3 measurements yield decisions that the medium is busy during a 10-measurement window, the determined load may be 30%.

The UE 106 may monitor WLAN traffic for all frequency bands as a whole, or may determine traffic for various frequency bands individually, and may accordingly calculate (and/or report) traffic load for all bands together or individually, as desired. The UE 106 may monitor traffic on one or more WLAN networks, and may calculate traffic load for all such networks together, individually, or in groups. In some embodiments, the BS 102 may not schedule any cellular traffic at the specific times (e.g., monitoring times) that the UE 106 is monitoring WLAN traffic, e.g., to avoid a false positive, e.g., a cellular transmission being counted as a WLAN transmission or otherwise interfering with a determination of whether or not the medium is busy.

In some embodiments, the UE 106 may take additional measurements of WLAN traffic (e.g., RSSI, SNR, etc.). The UE 106 may detect and/or store other information about WLAN traffic, e.g., SSID. The UE 106 may report any or all of such measurements/information to the BS 102.

In some embodiments, the UE 106 may, e.g., opportunistically, use WLAN circuitry to perform LBT for uplink transmissions (e.g., to the BS 102). This may reduce power consumption, e.g., in comparison to using cellular circuitry for LBT.

The BS 102 may also monitor/observe WLAN traffic/transmissions (804b). The BS 102 may monitor traffic according to the same monitoring parameters as UE 106, or may use different monitoring parameters (e.g., a smaller $T_m$, thus resulting in more frequent measurements, etc.). The BS 102 may calculate WLAN traffic load for various networks and/or frequency bands.

The BS 102 may take additional measurements of WLAN traffic (e.g., RSSI, SNR, etc.). The BS 102 may detect and/or store other information about WLAN traffic, e.g., SSID.

The BS 102 may be separated (e.g., spatially) from the UE 106. The WLAN traffic monitored by BS 102 may be associated with a different network (or networks) and/or frequency band(s) than that monitored by UE 106. Any number of networks/frequency bands may be monitored by both BS 102 and UE 106.

The UE 106 may transmit a traffic load report to the BS 102 (806). The report may indicate the calculated WLAN traffic load for one, some, or all monitored frequency bands and/or WLAN networks monitored by UE 106. The report may be transmitted using various types of messages. The report may be one or more independent messages or may be transmitted as a component of one or more other messages, e.g., that serve an additional purpose. For example, the report may be transmitted using one or more radio resource control (RRC) messages or MAC control elements (MAC-CE), among other possibilities. The report format (e.g., number of bits, etc.) may be configured as desired.

The traffic load report may be either event-based or periodic/semi-persistent. In some embodiments, the UE 106 may be configured to transmit either or both event-based or periodic reports.

An event-based report may be transmitted in response to an event detected by the UE 106. For example, the UE 106 may transmit a report at any time that measured WLAN activity exceeds an activity threshold ($T_e$) or remains above such a threshold for period of time, e.g., for at least a configurable number (e.g., threshold number) of observations or observation windows. Further, an event-based report may be triggered based on hysteresis parameters which may be configured as desired (e.g., by the BS 102 as part of the monitoring parameters and/or by UE 106). Further, an event-based report may be triggered based on changes in the observed traffic load over time, e.g., in response to a rate of change of the traffic load exceeding a threshold, e.g., a reduction/increase of a configurable amount between a configurable number of observation windows. For example, an event-based report may be triggered in response to a change in load of x % in a period of y ms, among various possibilities.

A periodic or semi-persistent report may be transmitted regularly, e.g. at report periodicity, $T_R$. The UE 106 may transmit a traffic report at each observation window, or may transmit reports for multiple observation windows at once (e.g., may transmit a report every fifth observation window, among other possibilities). The timing/frequency of such periodic reports may be configured as desired, e.g., based on monitoring parameters transmitted by the BS 102. Similarly, the BS may configure a number of reports for the UE to send, e.g., over a period of time.

In some embodiments, the UE 106 may measure signal strength (e.g., reference signal strength indicator (RSSI)) of the WLAN and may not transmit traffic reports if the signal strength that it monitors is below a signal strength threshold. The UE 106 may transmit reports (either event-based, periodic, or both) if the signal strength exceeds such a threshold. Thus, the BS 102 may infer that, if no report is transmitted (e.g., received), the UE does not detect WLAN traffic at a signal strength above the threshold. The UE 106 may (e.g., periodically) transmit reports indicating no traffic above such a signal strength, e.g., in order to reduce the likelihood of a false negative (e.g., BS 102 wrongly determining the absence of WLAN traffic).

The traffic report(s) may include various information. As noted above, the report may include one or more observed WLAN traffic load ratios. The traffic load ratios may be adjusted based on any WLAN traffic of the UE 106 (e.g., any traffic of the UE 106 may be removed from the calculated load, or may be identified in the report). The report may include other measurements of the WLAN traffic (e.g., RSSI, SNR, etc.) taken by the UE 106. The report may include identifying information about the WLAN network (e.g., SSID of the network, etc.).

In some embodiments, the report may use CQI values to indicate traffic load levels. New CQI values may be configured for this purpose, or definitions of existing CQI values may be adjusted, among various possibilities. For example, a negative CQI value may be configured to indicate heavy traffic with other conditions corresponding to the (e.g., opposite, positive) CQI value. For example, CQI=−4 may indicate CQI=4, with WLAN traffic above a threshold. Similarly, a bit may be added to a CQI report in order to indicate whether or not observed WLAN traffic load exceeds a threshold. Further, a bit may be added to indicate whether observed WLAN traffic exceeds a signal strength threshold.

The BS 102 may determine whether a hidden (e.g., not detected by the BS 102) WLAN network is present at (e.g., near, in the vicinity of) the UE 106 (808). In other words, the BS 102 may determine whether transmissions between the UE 106 and the BS 102 may impact (and/or be impacted by) transmissions on a WLAN in the area of the UE 106. For example, if the UE 106 is in the range of a WLAN, collisions may occur between cellular and WLAN transmissions. Thus, such a WLAN may be considered to be present at or near the location of the UE 106.

The BS 102 may compare the WLAN traffic load reported by the UE 106 and the WLAN traffic load observed by the BS 102, and the determination may be based at least in part on the comparison. If the traffic load observed by the BS 102 is different (e.g., higher or lower by at least a threshold) than the traffic load reported by the UE 106, a hidden WLAN network may be present at the location of the UE 106. In other words, if the absolute value of the difference between the observed load and reported load exceeds a threshold, the BS 102 may determine that a hidden WLAN is present at UE 106. Higher traffic load at the UE 106 may indicate that the UE 106 is in the range of a WLAN network that is hidden from the BS 102, e.g., because one or more additional networks may be present to generate the additional traffic observed by the UE 106. However, lower traffic load at the UE 106 may also indicate that the UE 106 is in the range of a hidden WLAN network, e.g., because the lower traffic load may be associated with a different WLAN network than a network directly observed by the BS 102.

The BS 102 may calibrate WLAN traffic reports from UE 106 to exclude the contribution of any cellular traffic. For example, the BS 102 may be aware of (e.g., due to its scheduling role as well as direct detection) of any cellular traffic occurring at the times of the observations in the traffic load reports transmitted by UE 106. In the case that the BS 102 schedules WLAN traffic observations (e.g., of the UE 106 and/or BS 102) to occur at times when no cellular traffic occurs, such calibration may not be necessary and may not be performed. Similarly, the BS 102 may be aware of and calibrate for any traffic of other cellular BSs.

The BS 102 may consider additional information to determine the presence of a hidden WLAN network. For example, the BS 102 may compare the SSIDs of reported networks to the SSIDs of networks observed by the BS 102. The BS 102 may use traffic reports from multiple UEs or may only use the traffic report from UE 106. In some embodiments, the BS 102 may exchange WLAN traffic information (e.g., observed directly and/or reported by one or more UEs 106) with additional BS 102s. The BS 102 may further use such information received from other BS 102s to determine whether WLAN is present at each UE 106.

In some embodiments, the BS 102 may compare reports from multiple UEs. For example, the BS 102 may compare load levels, SSIDs, etc., and use the comparisons to determine the location/range/extent of one or more hidden WLANs. The BS 102 may compare reports of UEs located close together (e.g., in similar surroundings) and/or in different areas of the cell provided by BS 102.

In response to determining that a hidden WLAN is present at the location of UE 106, the BS 102 may take one or more actions. For example, the BS 102 may determine additional information, adjust scheduling, add the UE 106 to a list of UEs in range of a hidden WLAN, may adjust parameters of the UE 106, and/or may inform one or more other devices. Further, the BS 102 may continue to monitor traffic and receive traffic reports to determine if/when the hidden WLAN is no longer present at the UE 106, whether the WLAN becomes visible to the BS 102 (e.g., is no longer hidden), or whether any additional hidden WLANs become present at the UE 106.

In response to determining that a hidden WLAN is present at the location of UE 106, the BS 102 may determine additional information. For example, the BS 102 may determine the load level of the hidden WLAN. In other words, the BS 102 may determine whether the hidden WLAN has high or low traffic, e.g., based on comparing the received traffic load report(s) and/or observation(s) to one or more thresholds. The determination of load level may be relative, e.g., in comparison to WLAN traffic load of other UEs or based on other conditions.

In response to determining that a hidden WLAN is present at the location of UE 106, the BS 102 may adjust (e.g., current, future) scheduling. For example, if the hidden WLAN has high traffic (e.g., above a threshold), the BS 102 may prioritize assigning UE 106 to other carriers or bandwidth parts (BWP) (e.g., carriers or BWPs where there is less chance of interference with WLAN) in order to reduce/avoid collisions between cellular traffic to UE 106 and WLAN traffic of the hidden network. For example, the BS 102 may assign the UE to licensed spectrum. For example, the BS 102 may schedule some or all traffic of the UE on licensed carriers. The BS 102 may determine to schedule uplink and/or downlink traffic of the UE on licensed carriers, e.g., based on a determination of whether uplink or downlink traffic may be more likely to interfere with WLAN traffic, e.g., including beamforming gain. Similarly, BS 102 may assign the UE 106 to use a different portion(s) or frequency of the unlicensed spectrum, e.g., in order to shift the UE 106 to bandwidth parts in which collision is less likely. For example, the BS 102 may identify such different portions of the unlicensed spectrum based on monitoring traffic directly and/or based on traffic load reports, e.g., the BS 102 may select frequencies that are less used (e.g., recently and/or based on many observations). The BS 102 may also reschedule a UE 106 in range of a low-traffic WLAN (e.g., preemptively, if other carriers are available). Further, the BS 102 may adjust the schedule of one or more other UEs in order to "free up" or make available such carriers for a UE 106 that is in range of a hidden WLAN.

In response to determining that a hidden WLAN is present at the location of UE 106, the BS 102 may identify (e.g., mark) the UE 106 as in the range of a hidden WLAN and may retain such information (e.g., by maintaining and periodically or continually updating a list of such UEs). For example, if the hidden WLAN has low traffic, the BS 102 may not (e.g., or may) immediately reschedule the UE 106 for alternative carriers, and may identify the UE 106 as in range of a hidden WLAN. Such identification may allow the BS 102 to respond more quickly (e.g., or differently) if the traffic becomes high at a future time.

In response to determining that a hidden WLAN is present at the location of UE 106, the BS 102 may change one or more parameters of the UE 106. For example, the BS 102 may transmit new (e.g., or different) traffic monitoring parameters to the UE 106. Further, the BS 102 may modify one or more cell reselection and/or offloading parameters of UE 106 in response to determining the presence of a hidden WLAN.

In response to determining that a hidden WLAN is present at the location of UE 106, the BS 102 may transmit an indication to UE 106 of the determination of the presence of a hidden WLAN. For example, the BS 102 may transmit such an indication to UE 106. Further, BS 102 may inform one or more other base stations or other network elements of the presence of a hidden WLAN.

In some embodiments, the BS 102 may continue to monitor traffic and receive traffic reports to determine any changes in hidden WLANs present at UE 106. For example, the BS 102 may determine if/when the hidden WLAN is no longer present at the UE 106 (e.g., due to motion of the UE 106, motion of the AP 104, deactivation of the AP 104, etc.) and/or if the traffic load of the hidden WLAN changes (e.g., transitions from high to low or low to high). Further, the BS 102 may determine whether/if/when the WLAN becomes visible to the BS 102 (e.g., is no longer hidden). For example, the WLAN may no longer be hidden due to motion of the AP 104, increases in transmission power of the AP 104 and/or STAs on the WLAN, etc.). Further the BS 102 may determine whether any additional hidden WLANs become present at the UE 106.

Figure 9:
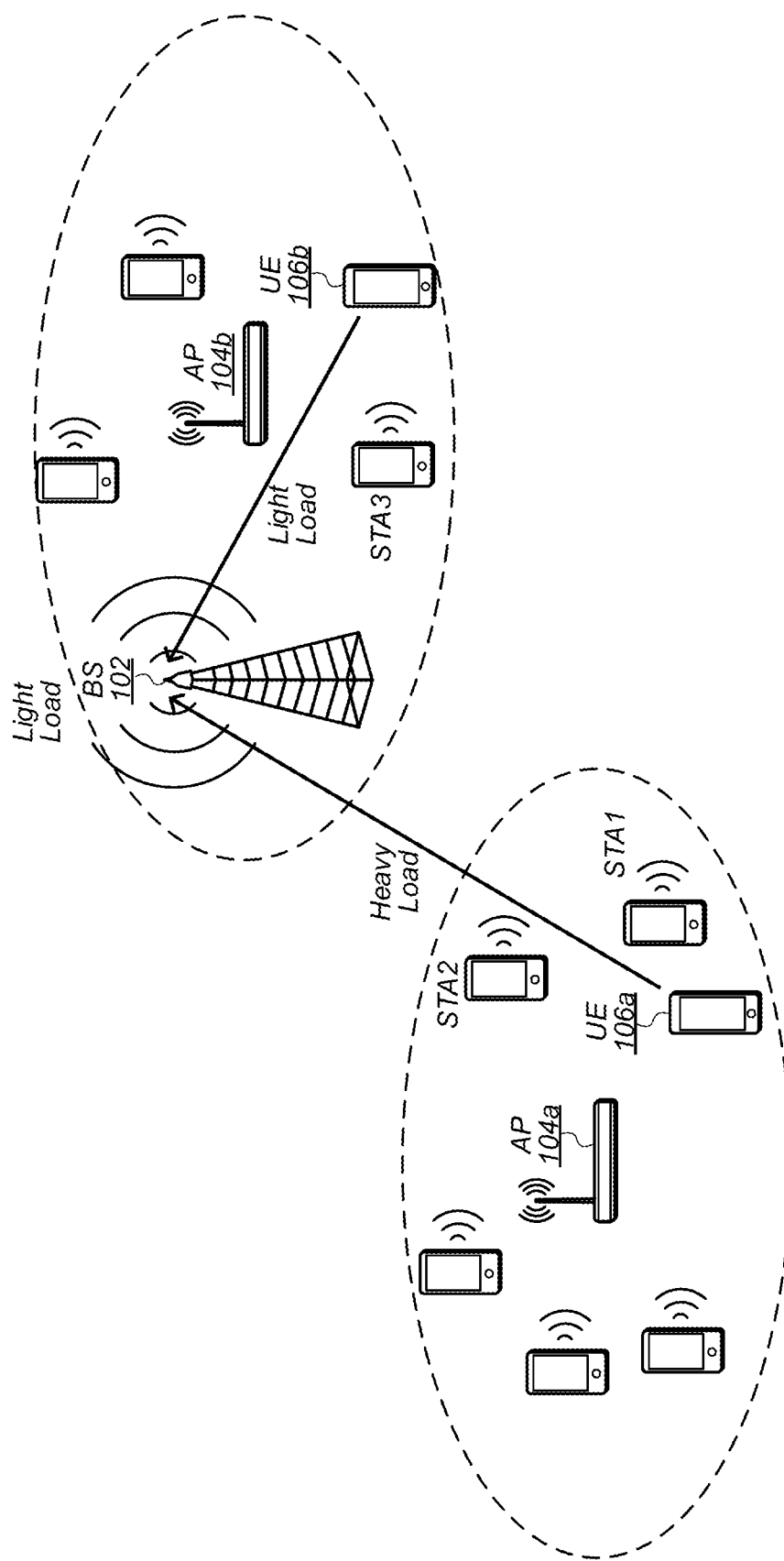
FIG. 9 illustrates a BS receiving traffic load reports from two UEs, according to some embodiments.

FIG. 9—Example Interaction of 5G and WLAN and Traffic Load Reports

FIG. 9 illustrates the exemplary WLAN networks in range of a cellular/5G BS 102, e.g., as described with respect to FIG. 7. BS 102 may detect (e.g., by direct observation) WLAN traffic of the network of AP 104*b*, and, based on monitoring, may observe light load (e.g., a low traffic ratio) of that WLAN. UE 106*b* may also monitor WLAN traffic of the network of AP 104*b*, and, based on the monitoring, may observe light load. UE 106*b* may transmit a traffic report indicating the observed light load to BS 102. Based on comparing the load level observed directly and the reported load level, BS 102 may determine that there is not a hidden WLAN at the location of UE 106*b* (e.g., because any difference between observed and reported load may be lower than a configured threshold). Therefore, BS 102 and UE 106b may continue to communicate and may use LBT mechanics to reduce/avoid collisions with WLAN transmissions.

UE 106a may monitor WLAN traffic of the network of AP 104a, and, based on the monitoring, may observe heavy load. UE 106a may transmit a traffic report indicating the observed heavy load to BS 102. Based on comparing the load level observed directly and the reported load level, BS 102 may determine that there is a hidden WLAN at the location of UE 106a (e.g., because the difference between observed and reported load may be greater than a configured threshold). Therefore, BS 102 and UE 106a may continue to communicate, however BS 102 may take one or more actions to reduce/avoid collisions, e.g., BS 102 may reassign UE 106a to other carriers, e.g. which may not interfere with the WLAN transmissions.

Note that, if the relative loads of the networks of FIG. 9 were reversed, e.g., high load at AP 104b and UE 106b and low load at AP 104a and UE 106a, the BS 102 may still detect the hidden WLAN of AP 104a. For example, based on observing a difference between the load observed by the BS 102 and the UE 106a, the BS 102 may infer that the UE 106a is monitoring traffic of a different WLAN than BS 102. Still further, the BS 102 may make comparisons over time, e.g., based on multiple reports, and may further confirm this difference as the load levels fluctuate differently. For example, the BS 102 may monitor correlation over time between load levels measured directly by the BS 102 and by various UEs. Low correlation may indicate that different WLANs are observed.

Further Information and Examples

In one set of embodiments, an apparatus comprising a processing element may be configured to cause a base station to: establish a connection with a user equipment (UE), wherein the connection uses a first radio access technology (RAT); determine that the UE is capable of detecting transmissions of a second RAT; monitor traffic load of the second RAT; receive a traffic load report from the UE; and determine whether a hidden network of the second RAT is present at a location of the UE, wherein the determination is based at least in part on a comparison of the monitored traffic load and the traffic load report.

In some embodiments, the processing element may be further configured to cause the base station to: transmit monitoring parameters to the UE.

In some embodiments, the monitoring parameters may comprise at least: a monitor periodicity, and a traffic observation window.

In some embodiments, the monitoring parameters may be configured to cause the UE to monitor traffic at specific times.

In some embodiments, the processing element may be further configured to cause the base station to: avoid scheduling cellular traffic at the specific times.

In some embodiments, the comparison of the monitored traffic load and the traffic load report may comprise comparing an absolute value difference between the monitored traffic load and the traffic load report to a threshold.

In another set of embodiments, a method for operating a cellular base station may comprise: communicating with a user equipment (UE) using a cellular connection; observing wireless local area network (WLAN) transmissions; calculating WLAN traffic load, wherein said calculating is based on said observing; receiving at least one WLAN traffic load report from the UE; comparing the calculated WLAN traffic load and the at least one WLAN traffic load report; and determining, based at least in part on the comparing, whether a hidden WLAN is present at the UE.

In some embodiments, the method may further comprise: requesting a capability report from the UE; and receiving the capability report from the UE, wherein the capability report indicates that the UE is capable of detecting WLAN transmissions.

In some embodiments, the method may further comprise: in response to determining that a hidden WLAN is present at the UE, determining the load level of the hidden WLAN; and if the load level of the hidden WLAN is high, assigning the UE to carriers in licensed spectrum.

In some embodiments, the method may further comprise: transmitting first monitoring parameters to the UE; and in response to determining that a hidden WLAN is present at the UE, transmitting new monitoring parameters to the UE.

In some embodiments, observing WLAN transmissions may comprise determining a service set identifier (SSID) of at least a first WLAN, wherein the at least one WLAN traffic load report may comprise an SSID of at least a second WLAN, wherein determining whether a hidden WLAN is present at the UE may be further based on comparing the SSID of the at least a first WLAN and the SSID of the at least a second WLAN.

In some embodiments, the method may further comprise: calibrating the at least one WLAN traffic load report to exclude the contribution of cellular traffic.

In one set of embodiments, a method for operating a user equipment (UE) may comprise: establishing a connection with a base station (BS); receiving first monitoring parameters from the BS; monitoring wireless local area network (WLAN) traffic according to the first monitoring parameters, wherein said monitoring comprises calculating WLAN traffic load; and reporting WLAN traffic load to the BS.

In some embodiments, reporting WLAN traffic load to the BS may comprise transmitting periodic traffic load reports, wherein the traffic load reports are transmitted according to a report periodicity, wherein the report periodicity is configured according to the first monitoring parameters.

In some embodiments, reporting WLAN traffic load to the BS may comprise transmitting one or more event-based traffic load reports.

In some embodiments, the method may further comprise: determining that the WLAN traffic load has remained above an activity threshold for at least a period of time; and in response to said determining, transmitting an event-based traffic load report.

In some embodiments, the method may further comprise: determining that a rate of change of the WLAN traffic load exceeds a threshold; and in response to said determining, transmitting an event-based traffic load report.

In some embodiments, the method may further comprise: measuring signal strength of the WLAN traffic, wherein reporting WLAN traffic load to the BS comprises transmitting at least one traffic load report when the signal strength exceeds a signal strength threshold.

In some embodiments, reporting WLAN traffic load to the BS may comprise transmitting at least one traffic load report using one or more radio resource control messages.

In some embodiments, reporting WLAN traffic load to the BS may comprise transmitting at least one traffic load report using one or more media access control elements.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   a processor configured to cause a base station to:
   establish a connection with a user equipment (UE), wherein the connection uses a first radio access technology (RAT);
   receive a capability report from the UE;
   determine, based on the capability report, that the UE is capable of detecting transmissions of a second RAT, wherein the second RAT is a non-cellular RAT;
   in response to the determination that the UE is capable of detecting transmissions of the second RAT, transmit monitoring parameters to the UE, the monitoring parameters including:
   an observation window at a specific time; and
   a number of observations to perform within the observation window, wherein the number of observations is greater than 2;
   monitor traffic load of the second RAT based on a second number of observations which is greater than 2 within the observation window to determine a monitored traffic load;
   determine that there is a level of traffic of the first RAT during the observation window at the specific time based on traffic of at least one other cellular base station;
   receive an event-based traffic load report from the UE indicating a reported traffic load of the second RAT during the observation window at the specific time, wherein the event-based traffic load report comprises an indication of a reported traffic load of the second RAT based on the observation window and the number of observations, wherein the reported traffic load is a percentage of observations within the observation window for which the second RAT is measured to be busy;
   determine a calibrated traffic load by calibrating the reported traffic load of the second RAT during the observation window at the specific time by excluding contributions on the level of traffic of the first RAT during the observation window at the specific time; and
   determine that a hidden network of the second RAT is present at a location of the UE, wherein the determination is based at least in part on a comparison of the monitored traffic load and the calibrated traffic load.

2. The apparatus of claim 1, wherein:
   the base station is a cellular base station; and
   the first RAT is 5G NR.

3. The apparatus of claim 2, wherein the level of traffic of the first RAT during the observation window at the specific time is further based on scheduling information.

4. The apparatus of claim 3, wherein the processor is further configured to cause the base station to:
   avoid scheduling cellular traffic during the observation window at the specific time.

5. The apparatus of claim 1, wherein the comparison of the monitored traffic load and the calibrated traffic load comprises:
   determining a difference between a monitored traffic load and the calibrated traffic load; and
   comparing the difference to a threshold.

6. The apparatus of claim 1, wherein the event-based traffic load report is responsive to a traffic load of the second RAT exceeding a threshold.

7. The apparatus of claim 1, wherein the event-based traffic load report comprises an indication of a third number of observations for which a signal strength of the second RAT exceeds a signal strength threshold.

8. A base station, comprising:
   a radio; and
   a processor operably coupled to the radio and configured to cause the base station to:
   establish a connection with a user equipment (UE), wherein the connection uses a first radio access technology (RAT);
   receive a capability report from the UE;
   determine, based on the capability report, that the UE is capable of detecting transmissions of a second RAT, wherein the second RAT is a non-cellular RAT;
   in response to the determination that the UE is capable of detecting transmissions of the second RAT, transmit monitoring parameters to the UE, the monitoring parameters including:
   an observation window at a specific time; and
   a number of observations to perform within the observation window, wherein the number of observations is greater than 2;
   monitor traffic load of the second RAT based on a second number of observations which is greater than 2 within the observation window to determine a monitored traffic load;

determine that there is a level of traffic of the first RAT during the observation window at the specific time based on traffic of at least one other cellular base station;

receive an event-based traffic load report from the UE indicating a reported traffic load of the second RAT during the observation window at the specific time, wherein the event-based traffic load report comprises an indication of a reported traffic load of the second RAT based on the observation window and the number of observations, wherein the reported traffic load is a percentage of observations within the observation window for which the second RAT is measured to be busy;

determine a calibrated traffic load by calibrating the reported traffic load of the second RAT during the observation window at the specific time by excluding contributions on the level of traffic of the first RAT during the observation window at the specific time; and determine that a hidden network of the second RAT is present at a location of the UE, wherein the determination is based at least in part on a comparison of the monitored traffic load and the calibrated traffic load.

9. The base station of claim 8, wherein:
the base station is a cellular base station; and
the first RAT is 5G NR.

10. The base station of claim 9, wherein the level of traffic of the first RAT during the observation window at the specific time is further based on scheduling information.

11. The base station of claim 10, wherein the processor is further configured to cause the base station to:
avoid scheduling cellular traffic during the observation window at the specific time.

12. The base station of claim 8, wherein the comparison of the monitored traffic load and the calibrated traffic load comprises:
determining a difference between a monitored traffic load and the calibrated traffic load; and
comparing the difference to a threshold.

13. The base station of claim 8, wherein the event-based traffic load report is responsive to a traffic load of the second RAT exceeding a threshold.

14. The base station of claim 8, the event-based traffic load report comprises an indication of a third number of observations for which a signal strength of the second RAT exceeds a signal strength threshold.

15. A method, comprising:
at a base station:
establishing a connection with a user equipment (UE), wherein the connection uses a first radio access technology (RAT);
receiving a capability report from the UE;
determining, based on the capability report, that the UE is capable of detecting transmissions of a second RAT, wherein the second RAT is a non-cellular RAT;
in response to the determination that the UE is capable of detecting transmissions of the second RAT, transmitting monitoring parameters to the UE, the monitoring parameters including:
an observation window at a specific time; and
a number of observations to perform within the observation window, wherein the number of observations is greater than 2;
monitoring traffic load of the second RAT based on a second number of observations which is greater than 2 within the observation window to determine a monitored traffic load;
determining that there is a level of traffic of the first RAT during the observation window at the specific time based on traffic of at least one other cellular base station;
receiving an event-based traffic load report from the UE indicating a reported traffic load of the second RAT during the observation window at the specific time, wherein the event-based traffic load report comprises an indication of a reported traffic load of the second RAT based on the observation window and the number of observations, wherein the reported traffic load is a percentage of observations within the observation window for which the second RAT is measured to be busy;
determining a calibrated traffic load by calibrating the reported traffic load of the second RAT during the observation window at the specific time by excluding contributions on the level of traffic of the first RAT during the observation window at the specific time; and
determining that a hidden network of the second RAT is present at a location of the UE, wherein the determination is based at least in part on a comparison of the monitored traffic load and the calibrated traffic load.

16. The method of claim 15, wherein:
the base station is a cellular base station; and
the first RAT is 5G NR.

17. The method of claim 16, wherein the level of traffic of the first RAT during the observation window at the specific time is further based on scheduling information.

18. The method of claim 17, further comprising:
avoiding scheduling cellular traffic during the observation window at the specific time.

19. The method of claim 15, wherein the comparison of the monitored traffic load and the calibrated traffic load comprises:
determining a difference between a monitored traffic load and the calibrated traffic load; and
comparing the difference to a threshold.

20. The method of claim 15, wherein the event-based traffic load report is responsive to a traffic load of the second RAT exceeding a threshold.

* * * * *